Patented May 19, 1931

1,806,290

UNITED STATES PATENT OFFICE

ROBERT GRIESSBACH AND OTTO AMBROS, OF LUDWIGSHAFEN-ON-THE-RHINE, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY

CATTLE FODDER

No Drawing. Application filed January 4, 1928, Serial No. 244,553, and in Germany January 8, 1927.

The production of valuable cattle fodder from micro organisms, such as yeast, is rendered difficult by the instability of the products and by the difficulties in producing a nutritious matter easily to be digested.

We have found that valuable feeding matter of excellent durability and a high nutritive value is obtained if micro organisms containing albumen, for example varieties of yeasts, be subjected to autolysis by means of agents destroying the cells of the said micro organisms and thus enabling the degradation of all or part of the albumen by means of the enzymes, and the resulting products be then cautiously dryed after the neutralization of the acids formed by means of ammonia.

The products obtained consist of mixtures of albumoses, peptones and the like and of ammonium salts of the amino acids produced and are readily resorbed by the digestive system of animals. The sharp taste of the products of the autolysis is removed by the neutralization with ammonia and, in the dry state, the products possess an agreeable flavour resembling that of cheese.

In the said process the neutralization is preferably commenced only some time after the liquefaction of the mass has set in. By this method of working the action of the tryptic compounds is assisted by the weak acids formed during the autolysis, whilst the neutralization following later on produces the best conditions for the degradation of the peptones by the ereptic compounds of the yeast. On performing the autolysis in the manner described a quick degradation of the albumines of the yeast is obtained and the degree of the degradation and the composition of the resulting products may be varied in rather wide limits according to the alteration of the speed of neutralization. Thus, for example, higher amounts of lower degradation products prevail, if the neutralization be proceeded with very slowly.

The nature of this invention will be further illustrated by the following example but the invention is not restricted thereto. The parts are by weight.

*Example*

200 parts of yeast (with a water content of about 70 per cent) are mixed at room temperature with about 10 parts of ethyl acetate and, after the liquefaction of the mass has set in, are intensely stirred for about 10 to 15 minutes until a rather fluid mass of weakly acid reaction is obtained. The latter is then neutralized with an aqueous 20 per cent solution of ammonia and cautiously dried. The dry product contains about 57.5 per cent of protein, corresponding to a nitrogen content of about 9.2 per cent, of which 49 per cent of the total mass is digestible protein, according to the hydrochloric acid-pepsin test, and possesses an agreeable flavour of cheese.

What we claim is:

1. A process for the production of feeding matter for animals which comprises degradating micro organisms by autolysis, neutralizing the acids formed with ammonia and cautiously drying the product.

2. A process for the production of feeding matter for animals which comprises degradating yeast by autolysis, neutralizing the acids formed with ammonia and cautiously drying the product.

3. A feeding matter for animals comprising a mixture of ammonium salts of the amino acids from the autolysis of micro organisms.

4. A feeding matter for animals comprising a mixture of ammonium salts of the amino acids from the autolysis of yeast.

In testimony whereof we have hereunto set our hands.

ROBERT GRIESSBACH.
OTTO AMBROS.